United States Patent
Tsuda et al.

(10) Patent No.: US 9,272,322 B2
(45) Date of Patent: Mar. 1, 2016

(54) SUPPLY DEVICE, AND METHOD FOR SUPPLYING BAND-LIKE MEMBER

(75) Inventors: Jun Tsuda, Shiga (JP); Toshio Yamane, Shiga (JP); Tomonori Yamaji, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 103 days.

(21) Appl. No.: 14/237,283

(22) PCT Filed: Sep. 27, 2011

(86) PCT No.: PCT/JP2011/072109
§ 371 (c)(1),
(2), (4) Date: Feb. 5, 2014

(87) PCT Pub. No.: WO2013/046343
PCT Pub. Date: Apr. 4, 2013

(65) Prior Publication Data
US 2014/0190236 A1  Jul. 10, 2014

(51) Int. Cl.
| | |
|---|---|
| B21D 43/00 | (2006.01) |
| B21D 3/00 | (2006.01) |
| B21C 37/12 | (2006.01) |
| B29C 53/56 | (2006.01) |
| B29C 63/32 | (2006.01) |
| F16L 55/165 | (2006.01) |
| B29C 53/78 | (2006.01) |

(52) U.S. Cl.
CPC ............ B21D 43/006 (2013.01); B21C 37/121 (2013.01); B21C 37/126 (2013.01);
(Continued)

(58) Field of Classification Search
CPC ........ B21D 3/00; B21D 43/006; B29C 53/78; B29C 53/566; B29C 53/785; B29C 53/74; B29C 53/48; B29C 53/8008; B29C 53/8016; B29C 63/32; B29C 53/52; F16L 55/1655; B21C 37/12; B21C 37/121; B21C 37/126; B21C 37/207; B21C 37/23; B21C 47/10; B21C 47/12; B21C 47/14; B21C 37/124
USPC .......... 72/49, 50, 135, 137, 142, 368, 64–66, 72/141, 146, 371; 226/176, 181; 29/33 D, 29/521

See application file for complete search history.

(56) References Cited

U.S. PATENT DOCUMENTS

| | | | |
|---|---|---|---|
| 2004/0013472 A1* | 1/2004 | Akimoto et al. ........... 405/184.2 |
| 2005/0039843 A1 | 2/2005 | Johnson et al. | |

(Continued)

FOREIGN PATENT DOCUMENTS

| | | |
|---|---|---|
| EP | 1 658 172 A0 | 5/2006 |
| EP | 2 172 327 A1 | 4/2010 |

(Continued)

OTHER PUBLICATIONS

International Search Report for PCT/JP2011/072109 dated Nov. 1, 2011.

Primary Examiner — Peter DungBa Vo
Assistant Examiner — Joshua D Anderson
(74) Attorney, Agent, or Firm — Sughrue Mion, PLLC

(57) ABSTRACT

A feeding device (10) comprises: a support frame (12); an annular-shaped rotary frame (13); paired feeding rollers (15, 161) for nipping a strip-shaped member therebetween; a rotating motor (M1) for rotating the rotating frame (13); a feeding motor (M2) for rotating at least one (15) of the feeding rollers; and a driving force transmission mechanism (17) comprising a rotatable member relatively rotatable with respect to the rotating frame (13). The rotating frame (13) is rotated by driving of the rotating motor (M1) through a roller or a gear, and the at least one feeding roller (15) is rotated by the feeding motor (M2) through the driving force transmission mechanism (17), so that the strip-shaped member (100) is fed out in the form of a given helical configuration.

12 Claims, 14 Drawing Sheets

(52) U.S. Cl.
CPC ............... *B21D 3/00* (2013.01); *B29C 53/566* (2013.01); *B29C 63/32* (2013.01); *F16L 55/1655* (2013.01); *B29C 53/78* (2013.01)

(56) References Cited

U.S. PATENT DOCUMENTS

| | | |
|---|---|---|
| 2010/0184577 A1 | 7/2010 | Nakagaki et al. |
| 2011/0280665 A1* | 11/2011 | Emmons et al. ........... 405/184.2 |

FOREIGN PATENT DOCUMENTS

| | | |
|---|---|---|
| JP | 62-20987 A | 1/1987 |
| JP | 7-100927 A | 4/1995 |
| JP | 8-20069 A | 1/1996 |
| JP | 9-239836 A | 9/1997 |
| JP | 2007-503329 A | 2/2007 |
| JP | 2009-149049 A | 7/2009 |
| WO | 95/09725 A1 | 4/1995 |
| WO | 2005/018917 A2 | 3/2005 |

* cited by examiner

SUPPLY DEVICE, AND METHOD FOR SUPPLYING BAND-LIKE MEMBER

TECHNICAL FIELD

The present invention relates to a feeding device for feeding a strip-shaped member to a pipe forming device, and a feeding method for feeding a strip-shaped member using the feeding device.

BACKGROUND ART

In regard to an aging existing pipe, there is a technique of, through the use of an elongated strip-shaped member, forming a pipe-like body inside the existing pipe by a pipe forming device, to rehabilitate the existing pipe based on the pipe-like body. In such a rehabilitation technique, a strip-shaped member overlappingly wound around a drum is fed to a pipe forming device installed inside an existing pipe. In this process, it is necessary to allow the strip-shaped member pullingly unwound from the drum to be fed toward the pipe forming device while being formed in a given helical configuration. This means that the strip-shaped member has to be fed in synchronization with orbital and forward speeds of the pipe forming device. If the feeding of the strip-shaped member is insufficient, the strip-shaped member before reaching the pipe forming device is gradually reduced in helical diameter and increased in helical pitch, which is likely to cause a situation where the strip-shaped member is fully stretched and broken in the end. If the strip-shaped member is excessively fed, the helical pitch thereof is reduced, and the helical diameter thereof is gradually increased, so that the strip-shaped member can be turned upside down. This gives rise to a need to return the strip-shaped member to its original desirable helical configuration, resulting in deterioration in process efficiency.

In order to avoid such situations, it has been necessary to feed the strip-shaped member into the existing pipe, while monitoring and adjusting a feeding state of the strip-shaped member by a plurality of workers deployed on the ground and inside the existing pipe. As illustrated in FIG. 15, in an existing pipe 91, a worker 95 performs, inside a rehabilitation pipe 80, the task of monitoring a state of a strip-shaped member 100, and feeding the strip-shaped member 100 into a pipe forming device 96 while allowing the strip-shaped member 100 to maintaining an adequate helical pitch and diameter in synchronization with orbital and forward speeds of the pipe forming device 96.

However, deployment of many workers leads to an increase in cost. An existing pipe having a small diameter precludes deployment of a worker thereinside. Moreover, tasks inside an existing pipe involve a risk of unexpected events. Therefore, it is desired to make it unnecessary to deploy a worker inside an existing pipe.

For example, a strip-shaped member feed-out device described in Patent Document 1 comprises an inner cylinder supported and fixed with respect to a base, and an outer cylinder rotatably fitted on the inner cylinder. A hydraulic motor for rotationally driving the outer cylinder, and a hydraulic motor for feeding a strip-shaped member, are provided therein. Rotation of the hydraulic motor for rotationally driving the outer cylinder is transmitted to the outer cylinder to cause orbital movement of a feeding mechanism attached to the outer cylinder. In consequence of the orbital movement of the feeding mechanism, orbital movement is imparted to a strip-shaped member.

According to an operation of the hydraulic motor for feeding a strip-shaped member, an inner roller and an outer roller are rotated in mutually opposite directions. A strip-shaped member is fed forwardly while being nipped between the rollers.

LIST OF PRIOR ART DOCUMENTS

Patent Documents

Patent Document 1: JP 9-239836A

SUMMARY OF THE INVENTION

Technical Problem

The above feed-out device comprises the fixed inner cylinder, and the outer cylinder fitted on the inner cylinder, so that it is necessary to support the cylinders at opposite sides thereof, i.e., at the side of a support frame and at the side of guide gears.

Moreover, in the above feed-out device, the hydraulic motor is configured to be orbitally moved, so that it is necessary to allow hydraulic oil to flow between the inner cylinder and the outer cylinder. Thus, a structure for improving sealing performance with respect to working fluid becomes more complicated, and a fluid leakage inescapably occurs during disassembly of the device, so that reuse after disassemble or separation is substantially impossible.

The present invention has been made in view of the above problems, and an object thereof is to provide a strip-shaped member feeding device which makes it possible to eliminate a need for deploying, inside an existing pipe, a worker who intends to feed a strip-shaped member into a pipe forming device, and to feed out a strip-shaped member in the form of a helical configuration having an adequate helical pitch and diameter, thereby achieving an automatic pipe forming process, and a strip-shaped member feeding method using the feeding device.

Solution to the Technical Problem

The present invention provides a feeding device for feeding out a strip-shaped member in the form of a helical configuration. The feeding device comprises: a support frame; an annular-shaped rotary frame located on the side of an inner periphery of the support frame and supported in a rotatable manner; paired feeding rollers supported with respect to the rotary frame and configured to nip the strip-shaped member therebetween; a rotating motor installed to the support frame to rotate the rotary frame; a feeding motor installed to the support frame to rotate at least one of the feeding rollers; and a driving force transmission mechanism comprising a rotatable member relatively rotatable with respect to the rotary frame. The feeding device is configured such that the rotary frame is rotated by driving of the rotating motor through a roller or a gear, and at least one of the feeding rollers is rotated by driving of the feeding motor through the driving force transmission mechanism.

In the feeding device of the present invention, the feeding rollers are orbitally moved together with the rotary frame, while being rotated about respective axes thereof. Thus, the strip-shaped member nipped between the feeding rollers is fed out in a helical configuration. Thus, it becomes possible to stably feed the strip-shaped member toward the pipe forming device, without relying upon workers.

Examples of a specific configuration of the feeding device include the following. In a preferred embodiment, the rotary frame is comprised of a plurality of segments which are separably coupled together, and the at least one feeding roller is detachably coupled to the rotary frame, whereby the strip-shaped member can be set in the nipped state.

According to this feature, after carrying the feeding device in an existing pipe or a rehabilitation pipe, the strip-shaped member can be set to a nipped state between the paired feeding rollers, by releasing coupling of the segments of the rotary frame, and separating the at least one feeding roller. Thus, when the strip-shaped member led in an existing pipe is continuously fed to the pipe forming device to form a rehabilitation pipe, an additional feeding device can be installed in the rehabilitation pipe on an as-needed basis, not only before initiation of a process but also during the process, to feed the strip-shaped member, in a preferable configuration, to the pipe forming device without causing breakage of the continuous strip-shaped member.

Preferably, in the above feeding device, the rotary frame is provided with a guide for guiding the strip-shaped member to the feeding rollers.

According to this feature, the strip-shaped member can be smoothly led to the feeding rollers.

Preferably, in the above feeding device, rotation of the feeding motor is transmitted to the rotatable member through at least one selected from the group consisting of a sprocket, a gear, a roller and a belt, to cause the rotatable member to be circulatingly moved along the rotary frame.

According to this feature, the rotation of the feeding motor can be imparted to the rotatable member to cause the rotatable member to be smoothly circulatingly moved.

Preferably, in the above feeding device, rotation of the rotatable member is transmitted to the at least one feeding roller through at least one selected from the group consisting of a sprocket, a gear, a roller and a belt, to cause the at least one feeding roller to be rotated.

According to this feature, the rotation of the rotatable member can be imparted to the at least one feeding roller to cause the at least one feeding roller to be smoothly rotated about an axis thereof.

Preferably, in the above feeding device, the rotatable member is a chain or a belt.

According to this feature, driving of the feeding motor can be smoothly transmitted to the at least one feeding roller supported by the rotary frame, without causing structural complexity.

In the above feeding device, the driving force transmission mechanism may comprise: a drive sprocket configured to be rotated by the feeding motor; the rotatable member, wherein the rotatable member is configured to be circulatingly moved along the rotary frame according to rotation of the drive sprocket; a driven sprocket configured to be rotated by the rotatable member; a drive bevel gear configured to be rotated according to rotation of the driven sprocket; a driven bevel gear meshed with the drive bevel gear; and a rotary-shaft coupling configured to transmit rotation of the driven bevel gear to the at least one feeding roller.

This configuration also makes it possible to smoothly transmit the driving of the feeding motor to the at least one feeding roller supported by the rotary frame, without causing structural complexity.

Preferably, the above feeding device further comprises a mount provided just below the support frame, wherein the mount has a traveling wheel.

According to this feature, the feeding device can be moved using the travelling wheel and readily installed inside a rehabilitation pipe.

Preferably, the above feeding device further comprises a mount provided just below the support frame, wherein the support frame is supported with respect to the mount in a swingable manner about a horizontal shaft.

According to this feature, the support frame can be supported in an inclined state. Thus, after installing the feeding device at a bottom of a manhole, the strip-shaped member led through the manhole can be led into an existing pipe, while being changed in direction thereof, so that it becomes possible to smoothly feed out the strip-shaped member toward the pipe forming device.

A strip-shaped member feeding method using the feeding device configured as above is also included in the technical scope of the present invention.

Specifically, the present invention provides a method of feeding, to a pipe forming device, a strip-shaped member to be formed in a rehabilitation pipe. The method comprises the steps of: preparing a plurality of the above feeding devices, wherein the rotary frame is comprised of a plurality of segments which are separably coupled together, and the at least one feeding roller is detachably coupled to the rotary frame; installing the feeding devices in a rehabilitation pipe at a plurality of positions at intervals; penetratingly inserting the strip-shaped member in the rotary frame after releasing the coupling of the segments thereof; detaching the at least one feeding roller and nipping the strip-shaped member between the paired feeding rollers; attaching the feeding rollers to one of the separated segments of the rotary frame and coupling the separated segments of the rotary frame together to form an annular shape; and feeding out the strip-shaped member from one of the feeding devices toward a forward one of the remaining feeding devices or toward the pipe forming device, in the form of a helical configuration.

According to this feature, it becomes possible to newly or additionally install the feeding device on an as-needed basis, depending on a distance between the feeding device and the pipe forming device. Thus, it becomes possible to sufficiently cope with a situation where an existing pipe as a rehabilitation target has a relatively large length, thereby smoothly feeding the strip-shaped member in the firm of a helical configuration, under any circumstance.

Effect of the Invention

In the feeding device of the present invention, the feeding motor is installed to the support frame. The feeding rollers are rotated together with the rotary frame being rotated, while being rotated about respective axes thereof, so that it becomes possible to feed out the strip-shaped member in the form of an adequate helical configuration, with a significantly simple structure. Further, the strip-shaped member feeding method of the present invention makes it possible to install the feeding device and feed out the strip-shaped member in the form of an adequate helical configuration, irrespective of before initiation of a process or during the process. Thus, it becomes possible to eliminate a need for deploying a worker for the purpose of feeding the strip-shaped member to the pipe forming device, thereby performing a pipe forming process automatically, smoothly and efficiently.

BRIEF DESCRIPTION OF THE DRAWINGS

FIGS. 7(a) and 7(b) are explanatory diagrams schematically illustrating an operation of the feeding device, wherein FIG. 7(a) illustrates a state of driving force transmission on the side of a rotating motor, and FIG. 7(b) illustrates a state of driving force transmission on the side of a feeding motor.

FIGS. 14(a) and 14(b) are end views for explaining an operation of joining a strip-shaped member to form a rehabilitation pipe, wherein FIG. 14(a) illustrates a state before the joining, and FIG. 14(b) illustrates a state after the joining.

DESCRIPTION OF EMBODIMENTS

With reference to the drawings, a feeding device and a strip-shaped member feeding method, according to one embodiment of the present invention, will now be described.

Figure 6:
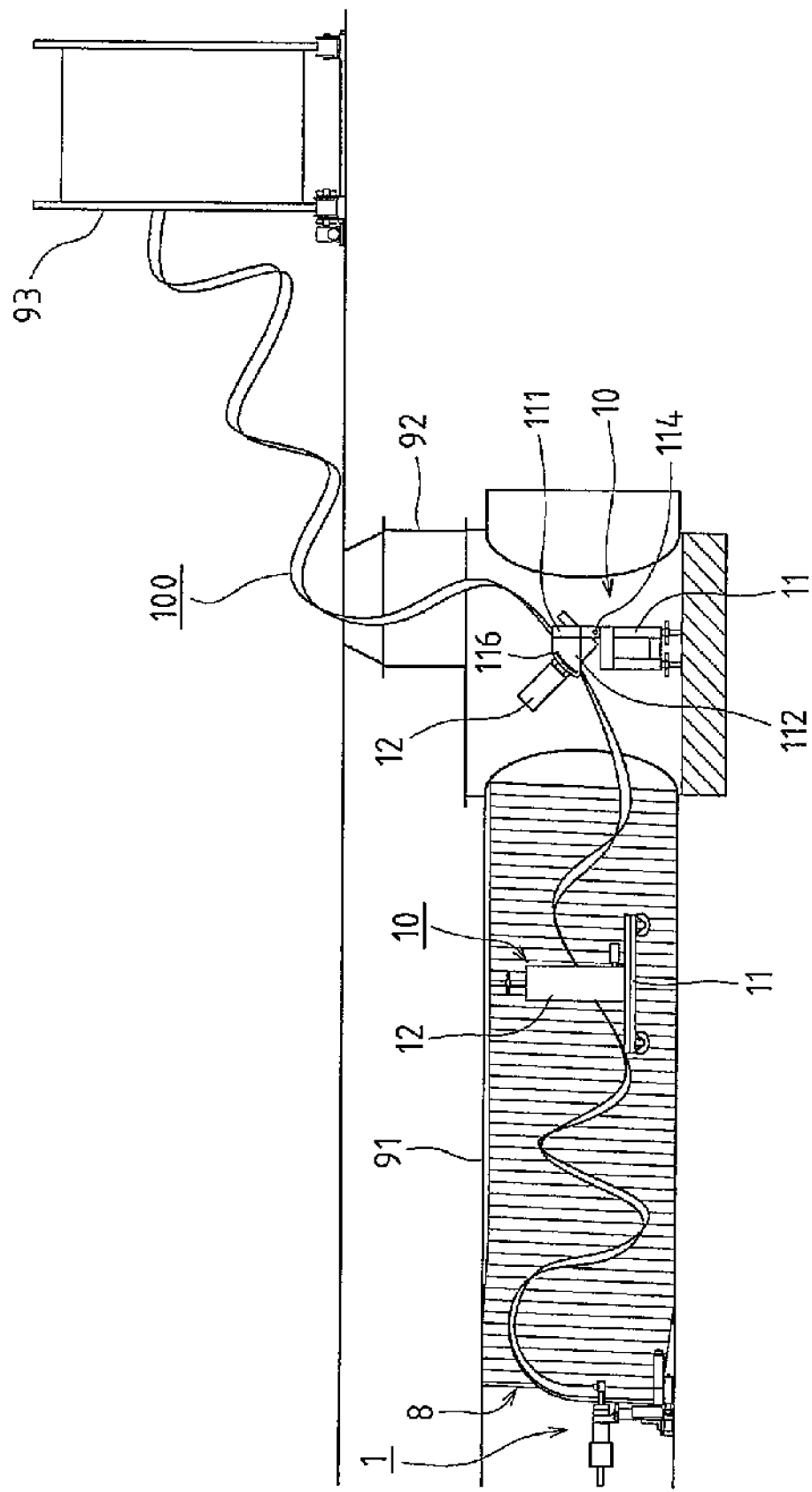
FIG. 6 is an explanatory diagram of an underground pipeline during a pipe forming process, wherein the feeding device is illustrated together with a pipe forming device.

FIGS. 1 to 5 illustrate a feeding device 10 according to one embodiment of the present invention, and FIG. 6 schematically illustrates a state of an underground pipeline during a pipe forming process.

The feeding device 10 is designed to feed a strip-shaped member 100 toward an aftermentioned pipe forming device 1. The feeding device 10 comprises: a mount 11 equipped with a plurality of rotatable wheels 118; an annular-shaped support frame 12 fixed to the mount 11; an annular-shaped rotary frame 13 located on the side of an inner periphery of the support frame 12 and supported in a rotatable manner; paired feeding rollers 15, 161 rotatably supported with respect to the rotary frame 13 through a mounting bracket 14; and a guide trough 151 supported in the same manner as the feeding roller 15 and configured to guide the strip-shaped member 100. The mounting bracket 14 is provided with a guide member 16 in a detachably manner. The support frame 12 is provided with a rotating motor M1 for rotating the rotary frame 13 and a feeding motor M2 for rotating the feeding roller 15.

The support frame 12 is formed in a channel shape having an opening on the side of an inner peripheral surface thereof. A drive roller 121 and a drive sprocket 123 are rotatably supported inside a lower portion of the support frame 12.

Further, a plurality of support rollers 122 are rotatably supported inside the lower portion of the support frame 12, at intervals in a circumferential direction of the support frame 12. That is, the support frame 12 is disposed to support an outer peripheral surface of the rotary frame 13 being rotated.

Each of the drive roller 121 and the support rollers 122 has a pair of flanges provided at respective longitudinal opposite ends thereof, with a distance corresponding to a width of the rotary frame 13. This prevents dropout of the rotary frame 13 which would otherwise occur when it is rotated while being supported by the drive roller 121 and the support rollers 122.

The rotating motor M1 and the feeding motor M2 are fixed to a bracket 124 which is coupled to a forward surface of the support frame 12. The rotating motor M1 has an output shaft coupled to a rotary shaft of the drive roller 121. The feeding motor M2 has an output shaft coupled to a rotary shaft of the drive sprocket 123. Thus, when the rotating motor M1 is activated, the drive roller 121 is rotated accordingly, and, when the feeding motor M2 is activated, the drive sprocket 123 is rotated accordingly.

The drive sprocket 123 is configured such that, when the rotary frame 13 is supported by the drive roller 121 and the support rollers 122 of the support frame 12, teeth of the drive sprocket 123 are meshingly engaged with holes 132h of an aftermentioned engagement belt 132 wound around the outer peripheral surface of the rotary frame 13 in a tensioned manner.

A support plate 125 is provided at a top of the support frame 12 in such a manner as to be raisable and lowerable by means of a screw mechanism. A worker can manually rotate a handle so as to cause the support plate 125 to be raised and brought into press-contact with a top region of a rehabilitation pipe 8. In addition to that, a non-illustrated brake of the wheels 118 may be manually operated to allow the feeding device 10 to be immovably held with respect to the rehabilitation pipe 8. After that, the support plate 125 can be lowered away from the top region of the rehabilitation pipe 8 to permit the feeding device 10 to be moved inside the rehabilitation pipe 8 by using the wheels 118.

Figure 1:
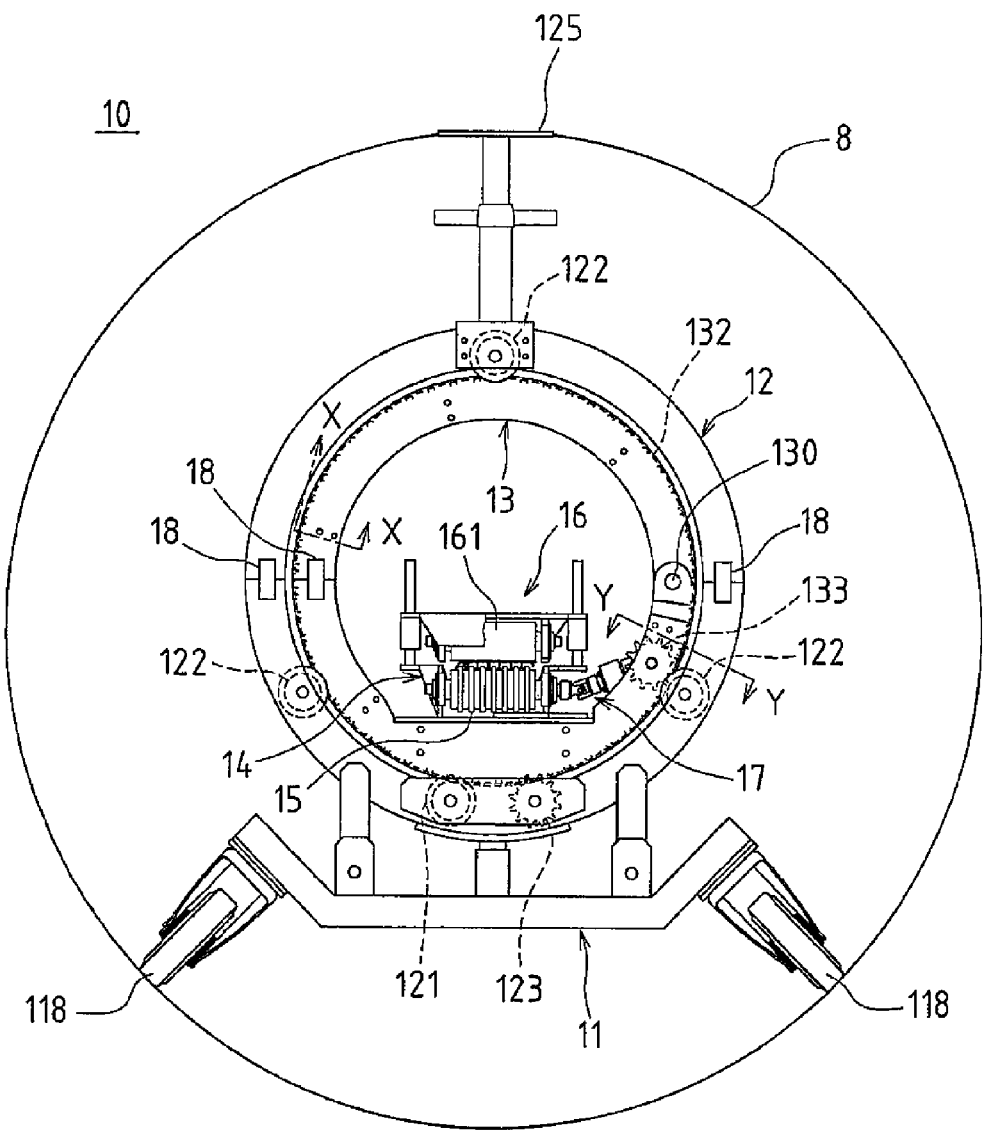
FIG. 1 is a front view illustrating, in a partially omitted manner, a feeding device according to one embodiment of the present invention.
Figure 2:
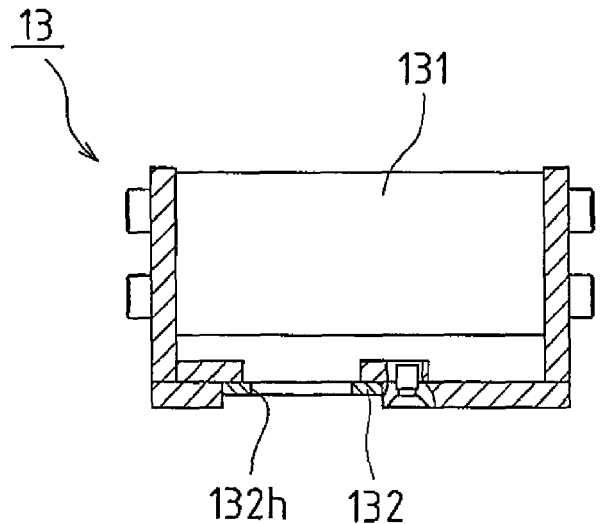
FIG. 2 is a sectional view taken along the line X-X in FIG. 1.
Figure 3:
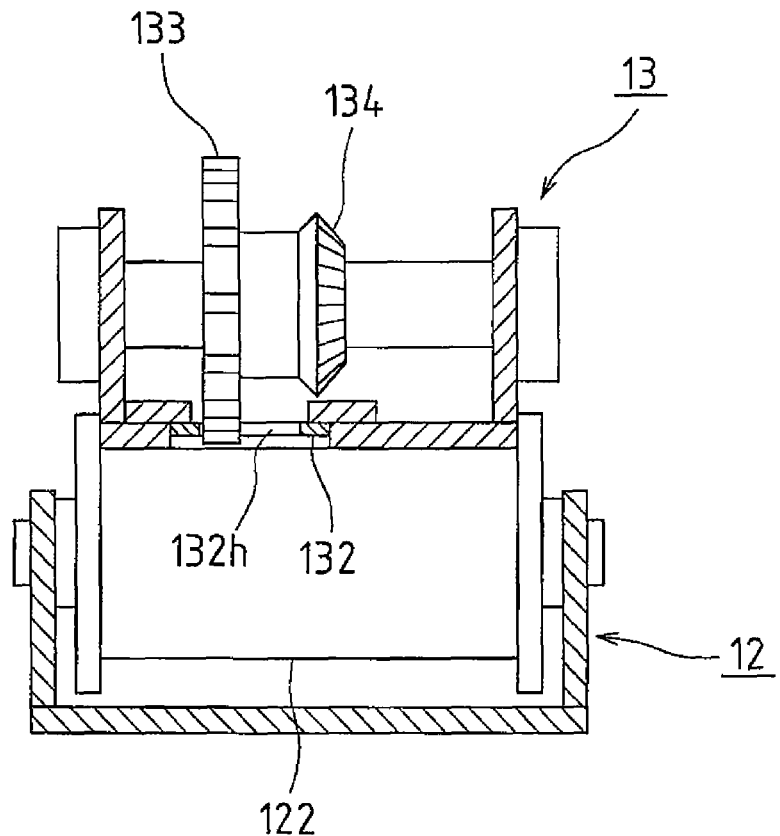
FIG. 3 is a sectional view taken along the line Y-Y in FIG. 1.
Figure 4:
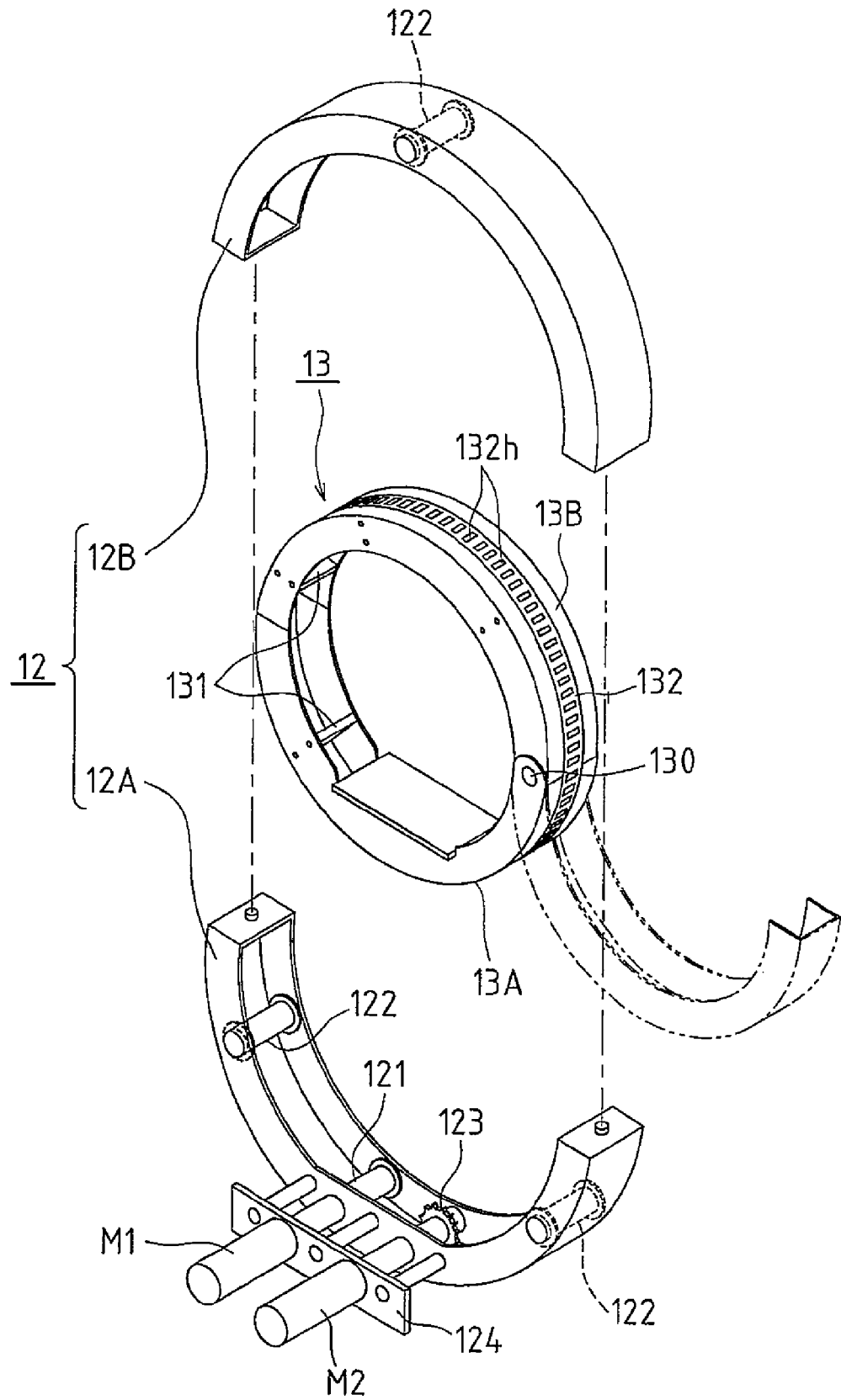
FIG. 4 is an exploded perspective view illustrating a support frame and a rotary frame in the feeding device.
Figure 5:
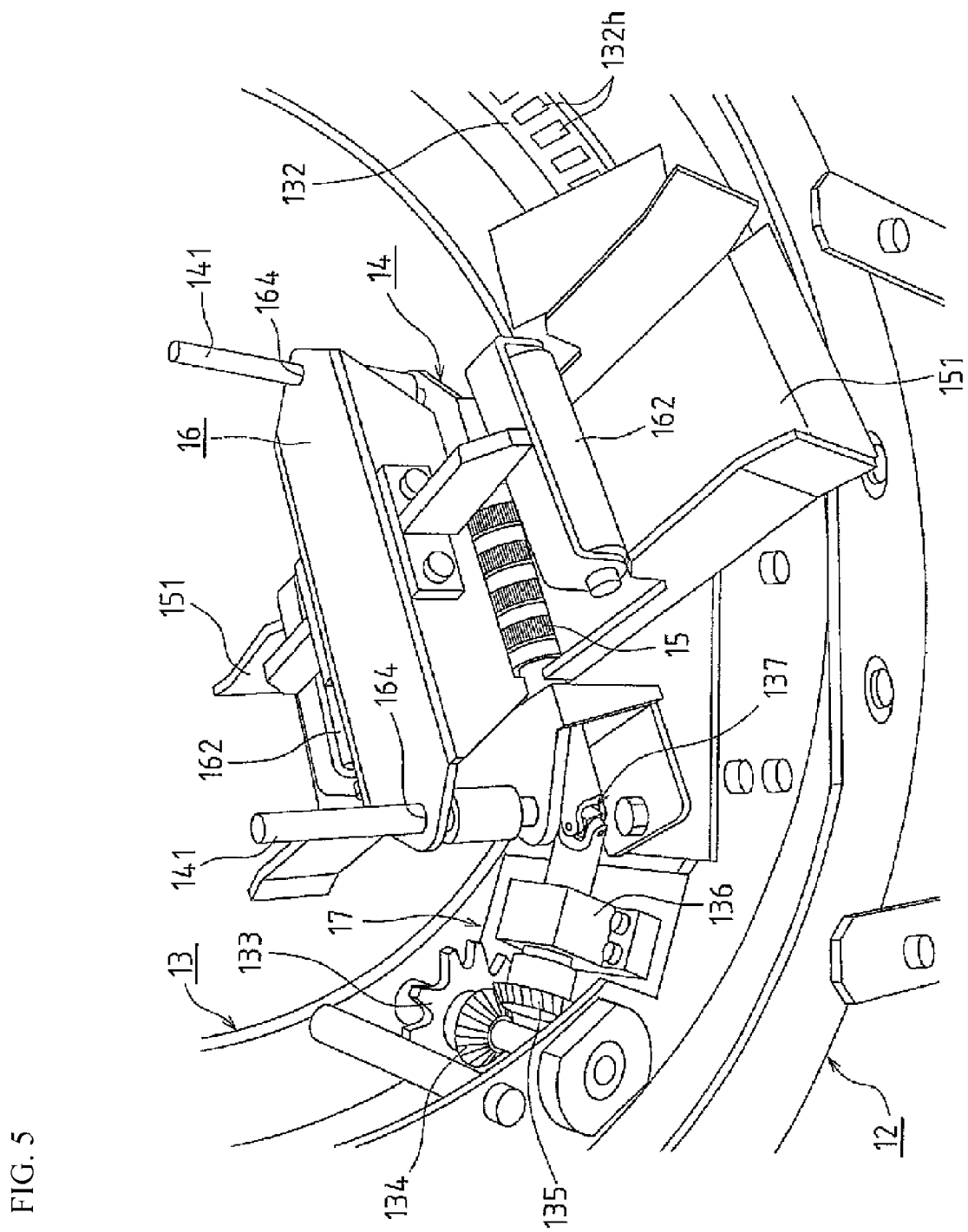
FIG. 5 is an exploded perspective view illustrating a driving force transmission mechanism of the feeding device, in a partially omitted manner.

As illustrated in FIG. 1, the support frame 12 has a lower half-segment 12A fixed to the mount 11. As illustrated in FIG. 4, the support frame 12 is comprised of the lower half-segment 12A and an upper half-segment 12B couplable thereto, so that it is formed to be separable into two. The lower half-segment 12A and the upper half-segment 12B are coupled together by a coupling piece 18 such as a hook piece. The upper half-segment 12B can be separated from the lower half-segment 12A by removing the coupling piece 18. Then, the lower half-segment 12A and the upper half-segment 12B can be butted against each other, and coupled together using the coupling piece 18 to form an annular shape.

Although the support frame 12 exemplified in this embodiment is formed in an annular shape, any other shape may be employed as long as it is capable of rotatably supporting the rotary frame 13. For example, the support frame 12 may be formed in a shape corresponding to only the lower half-segment 12A.

The rotary frame 13 is formed in a channel shape having an opening on the side of an inner peripheral surface thereof. The rotary frame 13 is internally provided with a plurality of reinforcing plates 131 arranged at intervals in a circumferential direction thereof. An endless-shaped rotatable member is installed on the rotary frame 13 in such a manner as to be relatively movable with respect to the rotary frame 13. In the exemplified embodiment, an engagement belt 132 is provided as the rotatable member.

The engagement belt 132 has a large number of holes 132h formed at intervals in a circumferential direction thereof. The engagement belt 132 is wound around the rotary frame 13 in a tensioned and circumferentially-movable manner. Further, the engagement belt 132 is formed such that the holes 132h thereof and teeth of an aftermentioned driven sprocket 133 are meshingly engaged with each other.

The mounting bracket 14 rotatably supporting the feeding roller 15 is fixed to the rotary frame 13. Further, a bearing 136 is fixed to the rotary frame 13 to rotatably support a rotary shaft of a driven bevel gear 135 meshingly engaged with a drive bevel gear 134. A rotary shaft of the feeding roller 15 and the rotary shaft of the driven bevel gear 135 are coupled together by a universal joint 137 as a rotary-shaft coupling (see FIG. 5).

Thus, when the feeding motor M2 is activated to rotationally drive the drive sprocket 123, the engagement belt 132 is driven through the drive sprocket 123 and circulatingly moved along the outer peripheral surface of the rotary frame 13, in the same rotational direction as that of the drive sprocket 123. The circulating movement of the engagement belt 132 causes rotation of a driven sprocket 133 meshingly engaged with the holes 132h of the engagement belt 132 and thus rotation of the drive bevel gear 134, which further causes rotation of the driven bevel gear 135 meshed with the drive bevel gear 134 and then causes rotation of the feeding roller 15 via the universal joint 137. A combination of the drive sprocket 123, the engagement belt 132, the driven sprocket 133, the drive bevel gear 134, the driven bevel gear 135 and the universal joint 137, makes up a driving force transmission mechanism 17 for transmitting a driving force of the feeding motor M2 to the feeding roller 15.

The rotatable member as one element of the driving force transmission mechanism 17 is not limited to the engagement belt 132, but may be any other type as long as it is an endless-shaped transmission member relatively movable with respect to the rotary frame 13. That is, the rotatable member may be any type of endless-shaped transmission member, such as a chain for chain transmission, a belt for belt transmission, and a roller chain for roller chain transmission. Examples thereof may include: a link belt capable of being rotated by the feeding motor M2 through a roller or the like; a belt member or a chain having a large number of protrusions or recesses compatible with both of the drive sprocket 123 and the driven sprocket 133; a toothed or cogged belt; and a perforated belt.

Further, the rotary-shaft coupling as one element of the driving force transmission mechanism 17 is not limited to the exemplified universal joint 137, but any other type of shaft coupling, such as a flexible coupling and an omni-directional coupling, may be employed, depending on configurations of other transmission members.

As illustrated in FIG. 4, the rotary frame 13 comprises a semicircular-shaped first half segment 13A provided with a part of the driving force transmission mechanism 17, and a semicircular-shaped second half segment 13B having one end rotatably coupled to one end of the first half segment 13A through a coupling shaft 130.

As illustrated in FIG. 4, the other ends of the first and second half segments 13A, 13B located opposed to the coupling shaft 130 with a central angle of 180 degrees therebetween are coupled together through a coupling piece 18 such as a hook piece. Thus, after removing the coupling piece 18, the second half segment 13B can be rotationally moved about the coupling shaft 130 with respect to the first half segment 13A and disposed in side-by-side relation to the first half segment 13A. In an opposite manner, the second half segment 13B can be rotationally moved about the coupling shaft 130 with respect to the first half segment 13A to allow the other ends thereof to be butted against each other, and then they can coupled together by the coupling piece 18, to form an annular shape.

The mounting bracket 14 is provided with the detachable guide member 16 as mentioned above. The guide member 16 rotatably supports a rotary shaft of the feeding roller 161, and respective rotary shafts of a pair of guide rollers 162 located across the feeding roller 161 (see FIG. 1) in a forward-backward direction.

More specifically, the guide member 16 is formed with two insertion holes 164 at positions corresponding to respective ones of a pair of coupling bolts 141 each standingly provided on the mounting bracket 14. The guide member 16 is mounted to the mounting bracket 14 by inserting each of the coupling bolts 141 of the mounting bracket 14 into a respective one of the insertion holes 164 of the guide member 16, and tightly screwing non-illustrated butterfly nuts onto the respective coupling bolts 141. In an opposite manner, the butterfly nuts can be loosened to allow the guide member 16 to be pulled out of the coupling bolts 141 and thereby separated from the mounting bracket 14.

In a state in which the guide member 16 is coupled to the mounting bracket 14, the feeding roller 161 in paired relation with the feeding roller 15 is located opposed to and just above the feeding roller 15 with a distance equivalent to a thickness of the strip-shaped member 100, therebetween. Thus, when the driving force of the feeding motor M2 is transmitted to the feeding roller 15 via the driving force transmission mechanism 17 as mentioned above, the feeding roller 15 is rotated in a given direction to feed out the strip-shaped member 100 or pull in the strip-shaped member 100 in the opposite direction, while nipping the strip-shaped member 100 between the paired feeding rollers 15, 161. In this process, the guide rollers 162 are located opposed to and just above the guide trough 151, so that the strip-shaped member 100 can be fed toward the feeding roller 15 along the guide trough 151. Then, the strip-shaped member 100 can be fed out from between the paired feeding rollers 15, 161 along the guide trough 151 and via one of the guide rollers 162.

Figure 14:
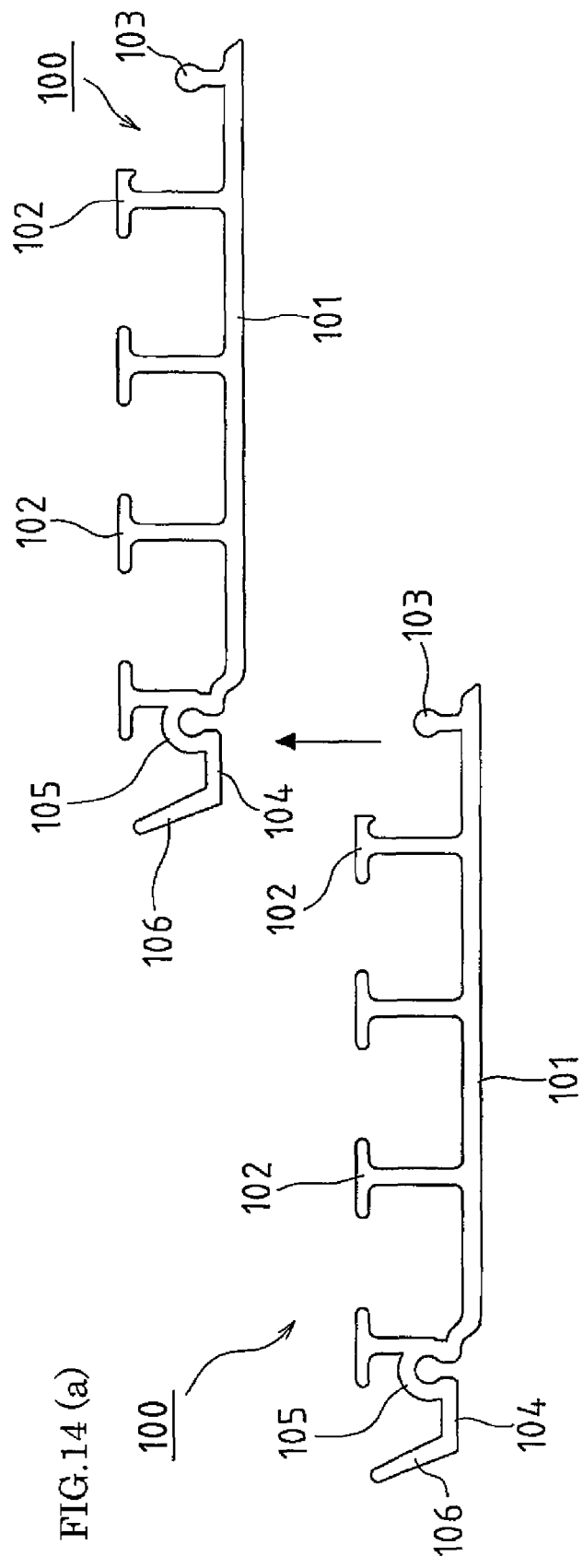
Figure 14:
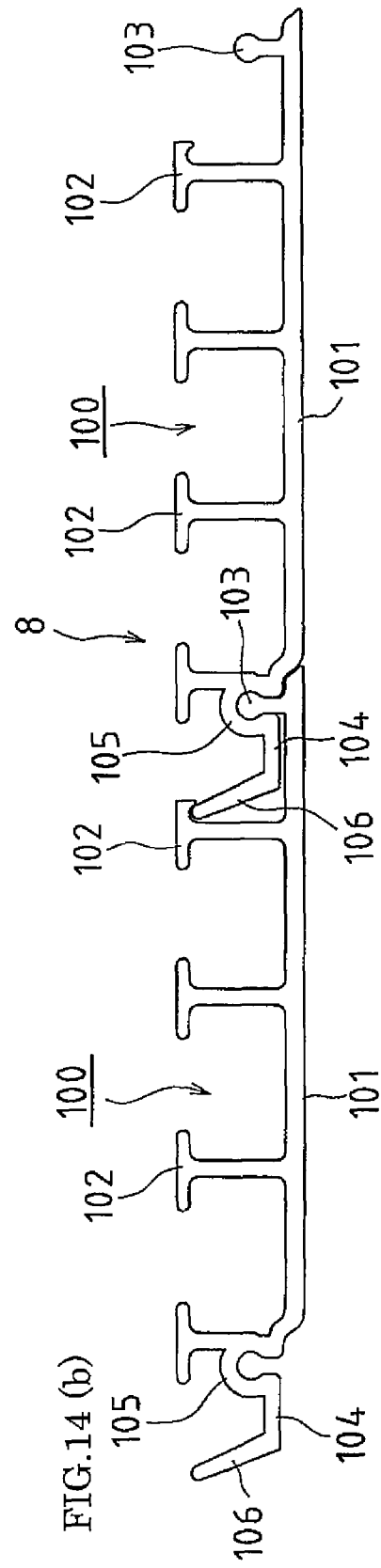
Figure 15:
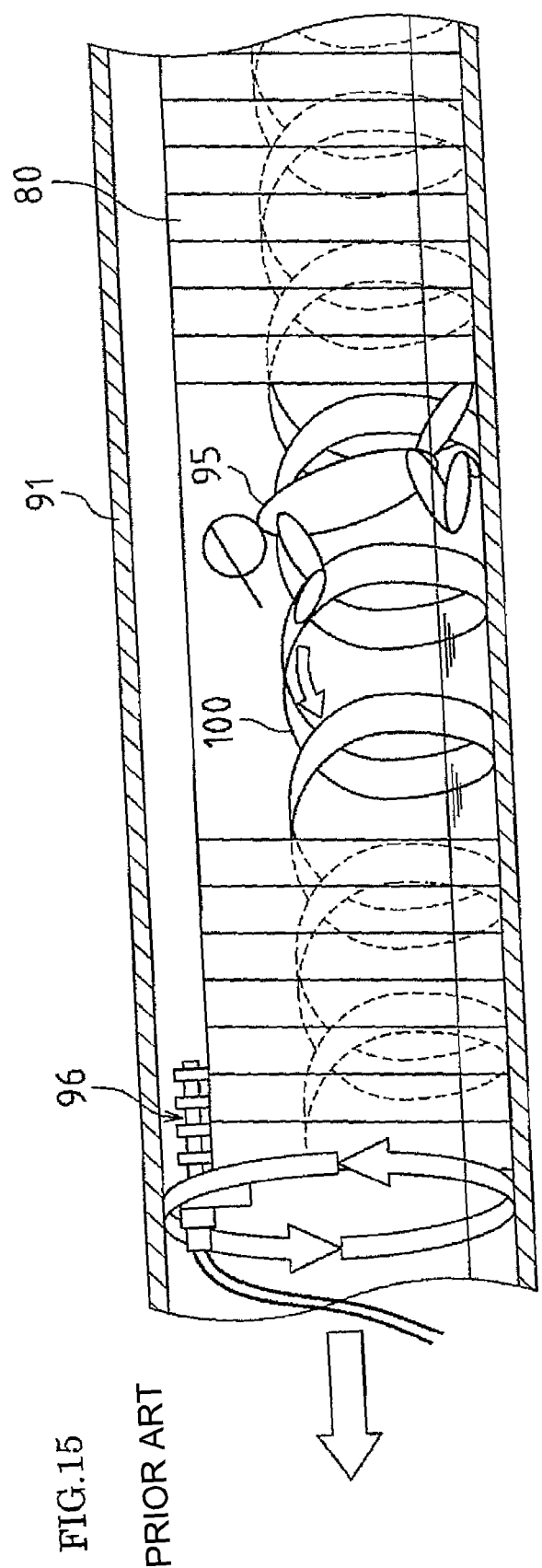
FIG. 15 is an explanatory view schematically illustrating the task of feed-in of a strip-shaped member, in a conventional pipe forming process.

The feeding roller 15 is formed to have a width insertable between adjacent ones of a plurality of ribs 102 of the strip-shaped member 100 and disposed between the adjacent ribs 102 (as for the strip-shaped member 100, see FIG. 14). The feeding roller 15 has a shaft section formed with a plurality of large-diameter portions each having a knurled outer peripheral surface. Each of the large-diameter portions is formed to have a width insertable between adjacent ones of a plurality of ribs 102 of the strip-shaped member 100 and disposed between the adjacent ribs 102 (as for the strip-shaped member 100, see FIG. 14). The outer peripheral surface of each of the large-diameter portions is in contact with a back surface of the strip-shaped member 100 serving as an outer peripheral surface of a rehabilitation pipe 8. This makes it possible to smoothly feed out or pull in the strip-shaped member 100.

The mounting bracket 14 is fixed in such a manner that, assuming the mounting bracket 14 is in a horizontal posture, it can be turned in a horizontal plane by a given angle with respect to an axis of the rotary frame 13, i.e., an inclination angle thereof with respect to the axis of the rotary frame 13 can be changed (FIG. 1 illustrates a state in which the feeding roller 15 is set at a position where an axis thereof extends in a direction perpendicular to the axis of the rotary frame 13 in top plan view). This makes it possible to adjust a lead angle or the like in a helical configuration of the strip-shaped member 100 which is fed out from the feeding device 19.

The above embodiment has exemplifies the case where the lower half-segment 12A of the support frame 12 is integrally fixed to the mount 11. However, in a situation where the feeding device 10 is installed on a bottom of a manhole 92, it is necessary to allow the strip-shaped member 100 led from the ground into the manhole 92 to be directed toward a pipe forming device 1 along an axial direction of an existing pipe 91. Therefore, in the feeding device 10 to be installed in the manhole 92, it is preferable that the support frame 12 is coupled to the mount 11 in such a manner as to be swingable around a horizontal shaft with respect to the mount 11, so as to smoothly feed out the strip-shaped member 100 while changing its direction from a vertical direction to a horizontal direction.

Specifically, as illustrated in FIG. 6, the support frame 12 is swingably coupled to the mount 11 through a horizontal shaft 114. A pair of posts 111 are standingly provided on the mount 11 to allow the support frame 12 to be interposed therebetween. Each of the posts 111 is fixedly provided with a guide plate 112 formed with an arc-shaped guide groove 116 having a center at the horizontal shaft 114. A non-illustrated fixing bolt is screwed through the guide groove 116 of the guide plate 112 into a female screw of the support frame 12. In this way, the support frame 12 can be fixed at any swing angle after swingingly moving the support frame 12 around the horizontal shaft 114. Thus, it becomes possible to allow the strip-shaped member 100 led into the manhole 92 to be directed inside the existing pipe 91 at a moderate angle.

This feeding device 10 is driven in synchronization with an operation of the pipe forming device 1. That is, when a rehabilitation pipe 8 is formed by the pipe forming device 1, the strip-shaped member 100 is fed from the feeding device toward the pipe forming device by a length corresponding to a length of the strip-shaped member 100 used for the formation of the rehabilitation pipe 8.

For example, the pipe forming device 1 is orbitally moved about an axis of an existing pipe 91. When a rehabilitation pipe 8 is formed by the pipe forming device 1, the pipe forming device 1 is displaced in a pipe axis direction (pipe forming direction) by a length corresponding to a length of the formed rehabilitation pipe 8. At the same time, a distance between the feeding device 10 and the pipe forming device 1 increases, each installed inside the rehabilitation pipe 8. Thus, a feeding amount per unit time of the strip-shaped member 100 from the feeding device 10 is equal to a sum of a circumferential movement speed of the pipe forming device 1, and a movement speed for compensating for a circumferential length of the strip-shaped member 100 corresponding to an increase in distance from the feeding device 10 resulting from the displacement of the pipe forming device 1 in an axial direction of the existing pipe 91.

When the pipe forming device 1 forms a rehabilitation pipe 8 and thus the distance from the feeding device 10 is increased, the strip-shaped member 100 fed from the feeding device 10 toward the pipe forming device 1 in the form of a helical configuration is increased in helical pitch of the helical configuration by a distance corresponding to the displacement of the pipe forming device 1. Thus, a rotational angle per unit time of the strip-shaped member 100 from the feeding device 10 is equal to a sum of an angular velocity of the pipe forming device 1, and an angular velocity for compensating for a rotational angle of an circulating movement of the rotary frame 13 corresponding to an increase in distance from the feeding device 10 resulting from the displacement of the pipe forming device 1 in the axial direction of the existing pipe 91.

Figure 7:
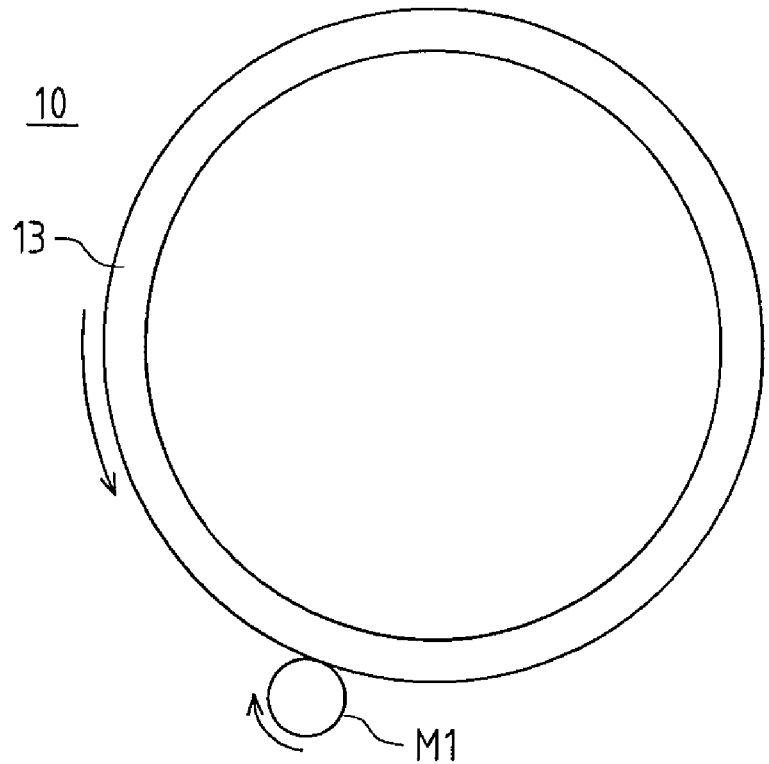
Figure 7:
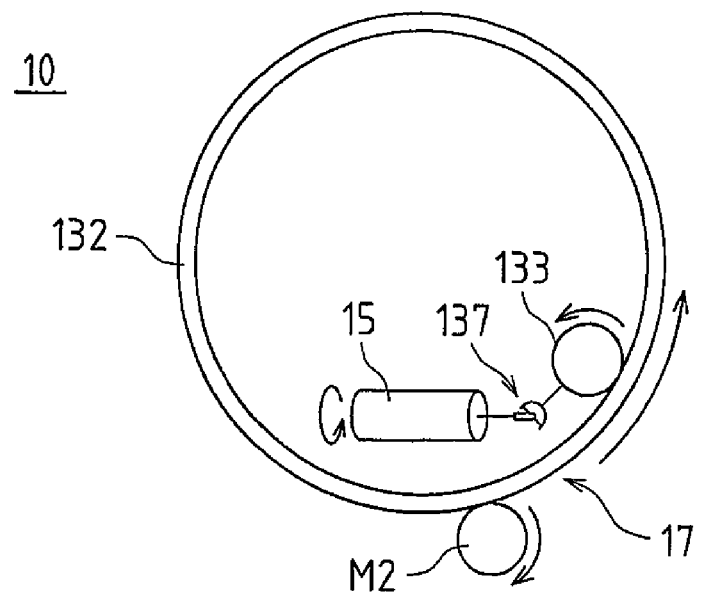

The rotating motor M1 and the feeding motor M2 are driven in such a manner as to satisfy these conditions. As schematically illustrated in FIG. 7(a), when the rotating motor M1 is driven, the rotary frame 13 is rotated at a predetermined angular velocity via the drive roller 121 (which is omitted in this figure). As schematically illustrated in FIG. 7(b), when the feeding motor M2 is driven, the feeding roller 15 is rotated at a predetermined number of rotations (predetermined rotational speed) via the driving force transmission mechanism 17 composed of the drive sprocket 123 and others. This makes it possible to feed the strip-shaped member 100 to the pipe forming device 1 in synchronization with the pipe forming device 1.

Figure 8:
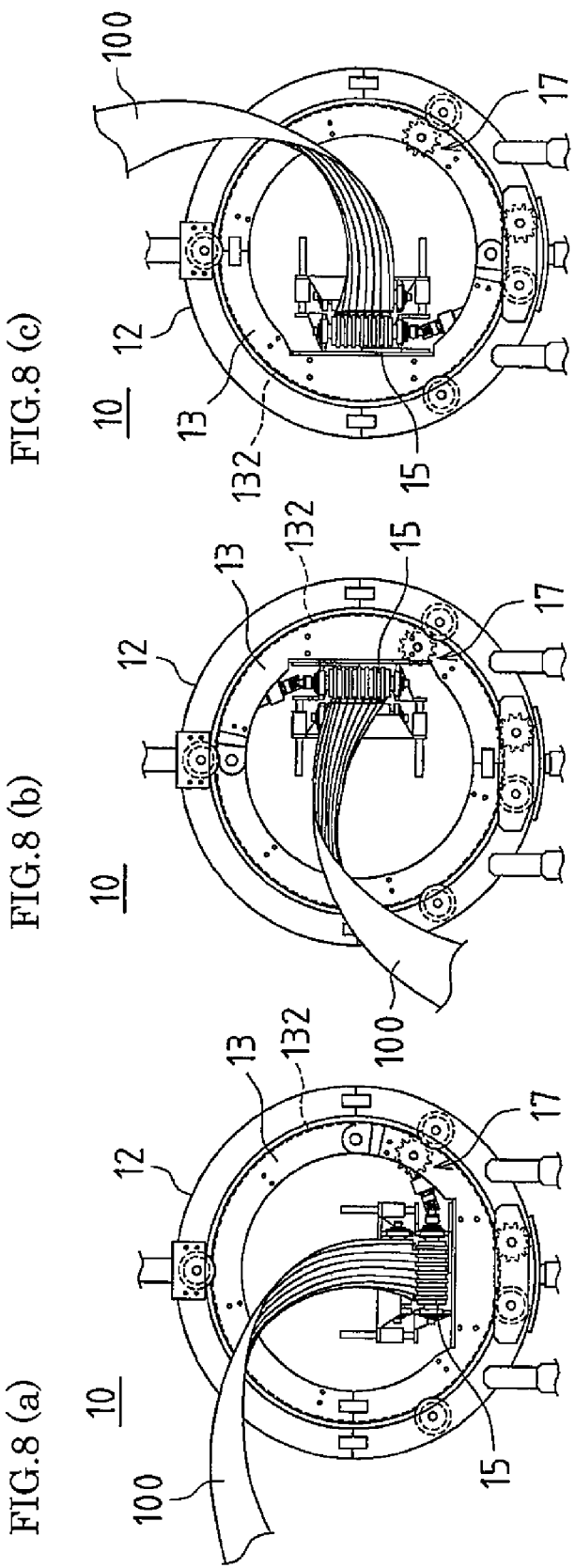
FIGS. 8(a) to 8(c) are explanatory diagrams illustrating, in a time-series manner, states in which the feeding device is feeding out a strip-shaped member.
Figure 9:
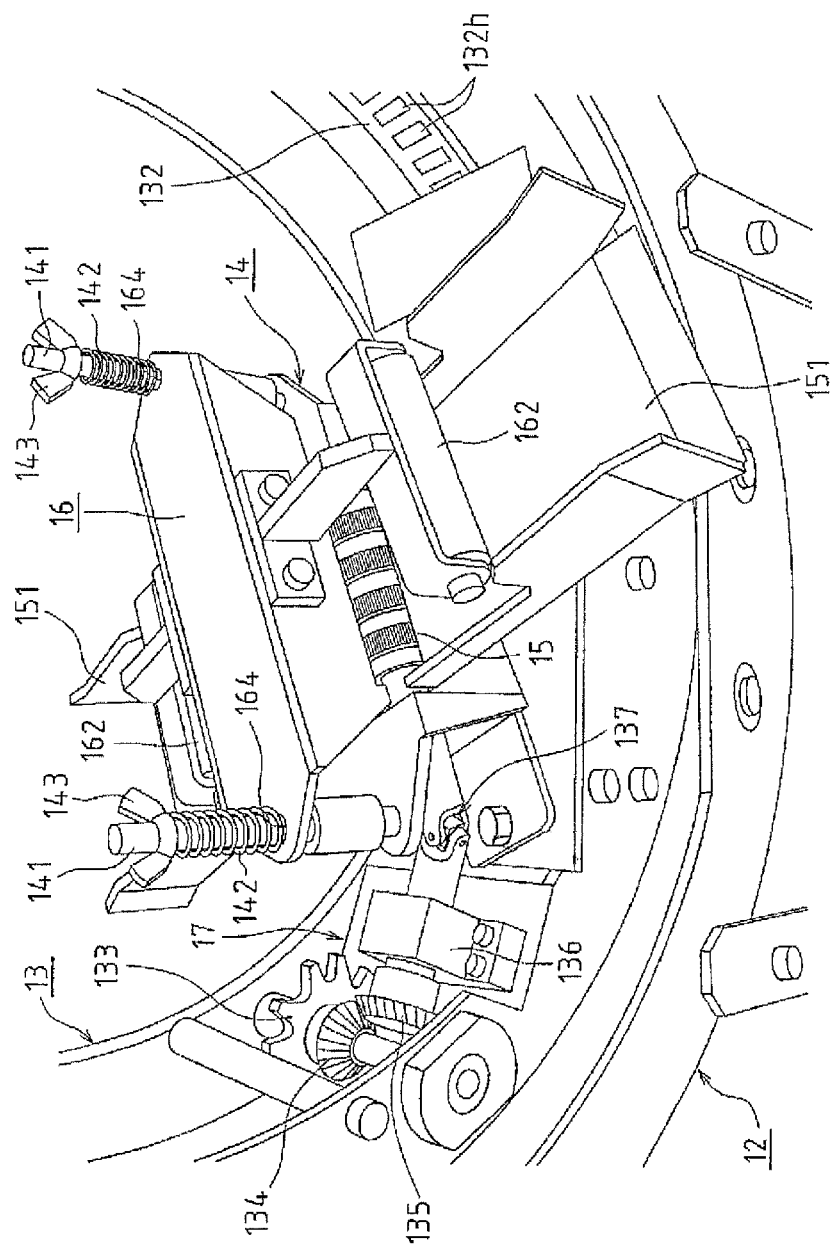
FIG. 9 is an enlarged perspective view illustrating, in a partially omitted manner, a driving force transmission mechanism, in a modification of the feeding device.

FIGS. 8(a) to 8(c) are explanatory diagrams illustrating, in a time-series manner, states in which the feeding device 10 is feeding out the strip-shaped member 100. As illustrated in FIG. 8(a), the strip-shaped member 100 nipped between the paired feeding rollers 15, 161 is being fed out toward the pipe forming device 1. At the same time, as illustrated in FIG. 8(b), the paired feeding rollers 15, 161 supported by the rotary frame 13 are orbitally moved along the inner periphery of the support frame 12 according to a circulating movement of the rotary frame 13, while feeding out the strip-shaped member 100. As illustrated in FIG. 8(c), the rotary frame 13 is further circulatingly moved, and the paired feeding rollers 15, 161 are further orbitally moved, so that the strip-shaped member 100 will be fed out in the form of a helical configuration.

During a period in which the pipe forming device 1 is being orbitally moved to form a rehabilitation pipe 8, the strip-shaped member 100 is fed out in the form of a helical configuration, as if it remained stationary, specifically, in such a manner as to allow the strip-shaped member 100 located between the feeding device 10 and the pipe forming device 1 to be maintained at approximately the same helical diameter, and increased in the number of helical pitches correspondingly to a displacement of the pipe forming device 1, while keeping a helical pitch length approximately constant.

In addition, the feeding motor M2 is installed to the rotation-free support frame 12, and the feeding roller 15 is rotated within the rotary frame 13 being rotated, thereby feeding out the strip-shaped member 100 in the form of a helical configuration. Thus, a power line for supplying a power to the feeding motor M2, e.g., a hydraulic pressure hose when the feeding motor M2 is a hydraulic motor, or an electricity cable when the feeding motor M2 is an electric motor, can be readily connect and disconnected, so that it becomes possible to significantly facilitate such a line installation task.

For example, a motor for the feeding roller 15 is installed in the rotary frame 13, it becomes difficult to connect a power line to the motor without interference with a strip-shaped member 100 being led toward the feeding device 10, although it is desirable in view of structural simplicity. That is, it becomes necessary to install a power line to extend via a center of a transport drum 93 on the ground and penetrate through an inside of the strip-shaped member 100. This causes a problem that the line installation task becomes significantly cumbersome and complicated. Moreover, if a trouble such as entanglement between the power line and the strip-shaped member 100 occurs, it is necessary to take a lot of time for restoring to original state. In contrast, the feeding apparatus 10 according to this embodiment can efficiently feed the strip-shaped member 100 without the occurrence of such a situation.

In the feeding device 10 according to the above embodiment, the mounting bracket 14 may be provided with a coil spring 142. In this modification, the coil spring 142 is attached to each of the coupling bolts 141, and a butterfly nut 143 is screwed in a threaded region of an upper portion of the coupling bolt 141. When the butterfly nut 143 is tightened, the coil spring 142 is pressed against the mounting bracket 14.

Thus, when the driving force of the feeding motor M2 is transmitted to the feeding roller 15, the feeding roller 15 operates to feed out or pull in the strip-shaped member 100 while nipping the strip-shaped member 100 in cooperation with the driven feeding roller 161. In this process, a clamping force between the mounting bracket 14 and the guide member 16 is appropriately adjusted by elasticity of the coil springs 142 attached to the mounting bracket 14, so that it becomes possible to smoothly feed out or pull in the strip-shaped member 100, while preventing the strip-shaped member 100 from being damaged.

Although the feeding device 10 according to the above embodiment is configured to transmit the driving force of the feeding motor M2 to the rotatable member, such as the engagement belt 132, via the exemplified mechanism, the present invention is not limited thereto, but a configuration may be employed in which the driving force is transmitted to the rotatable member via any suitable driving force transmission member, such as a sprocket, a gear, a roller or a belt.

Further, although the rotation of the rotatable member is transmitted to the feeding roller 15 via the exemplified mechanism, the present invention is not limited thereto, but a configuration may be employed in which the rotation is transmitted to the feeding roller via any suitable driving force transmission member, such as a sprocket, a gear, a roller or a belt, a rotary-shaft coupling, and others.

The above embodiment has been described based on an example where the rotary frame 13 is rotated via the drive roller 121 configured to be rotated by the rotating motor M1, the feeding device 10 of the present invention is not limited to such a roller transmission-based configuration, but any driving force transmission member may be employed.

For example, the rotary frame 13 may be rotated based on gear transmission obtained by providing a ring-shaped gear on a side surface of the rotary frame 13, and providing a gear meshed with the gear provided on the rotary frame 13, on the rotary shaft coupled to the output shaft of the rotating motor M1.

Figure 10:
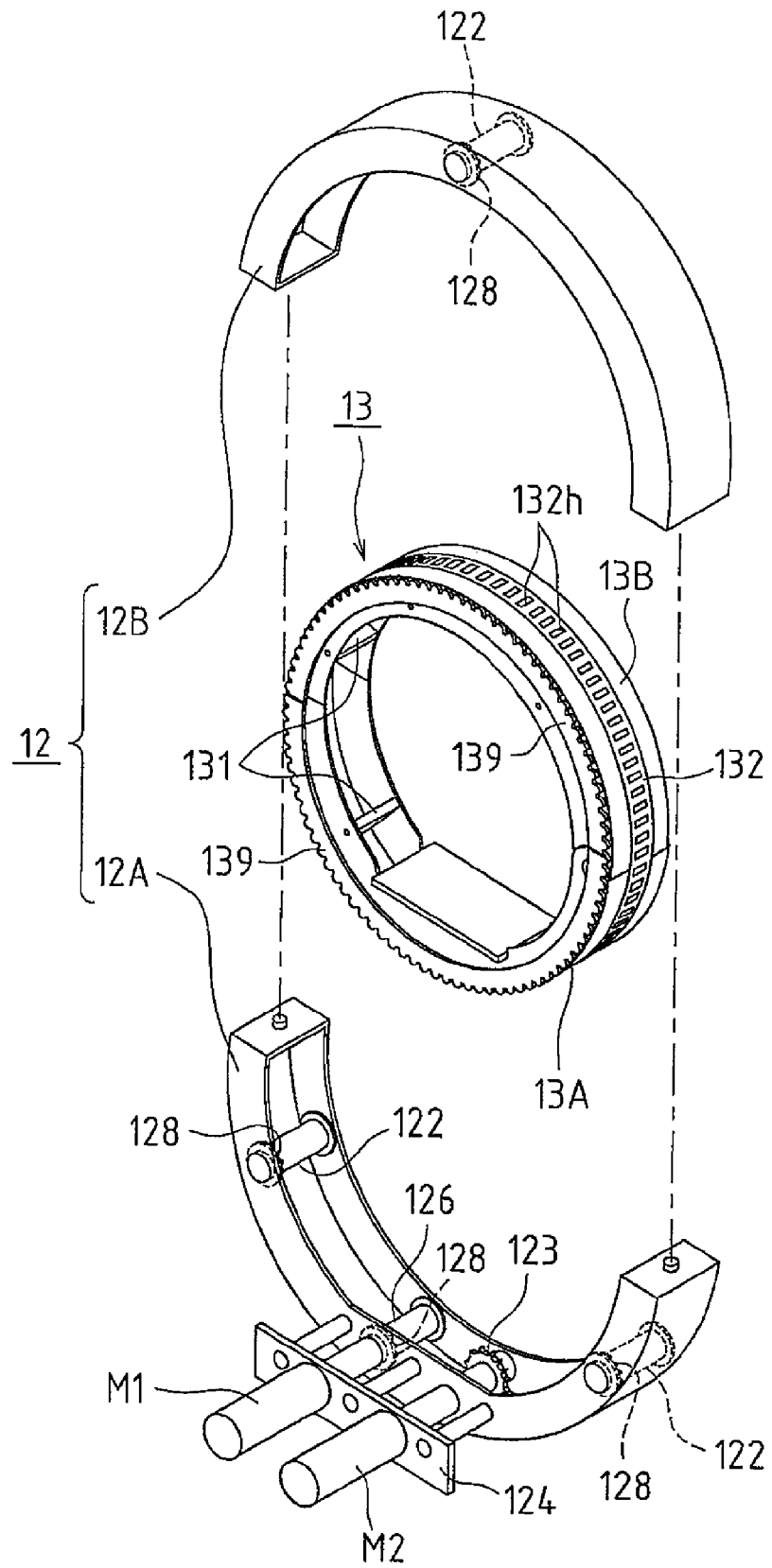
FIG. 10 is an exploded perspective view illustrating a support frame and a rotary frame, in another modification of the feeding device.

Specifically, as illustrated in FIG. 10, the rotary frame 13 has a gear plate 139 provided on one or each of a forward surface and a backward surface thereof. Each of a drive roller 126 supporting the rotary frame 13 from therebelow, and a plurality of support rollers 122 supporting lateral and top portions of the rotary frame 13, is provided with a guide gear 128 meshed with gear teeth of the gear plate 139. The guide gear 128 is integrally fixed to an outer surface of each of the drive roller 126 and the support rollers 122 at a position adjacent to a rear end flange thereof. The drive roller 126 is configured to be rotated in a state where the outer surface thereof is in contact with the outer peripheral surface of the rotary frame 13, and the guide gear 128 thereof is in mesh engagement with gear teeth around an outer peripheral edge of the rotary frame 13, thereby imparting a rotational force to the rotary frame 13.

The above feeding device 10 is capable of smoothly and adequately feeding out the strip-shaped member 100 nipped between the paired feeding rollers 15, 161, in the form of a helical configuration. Thus, it becomes possible to stably feed the strip-shaped member 100 toward the pipe forming device 1, without relying upon workers.

(Pipe forming Device)

Figure 11:
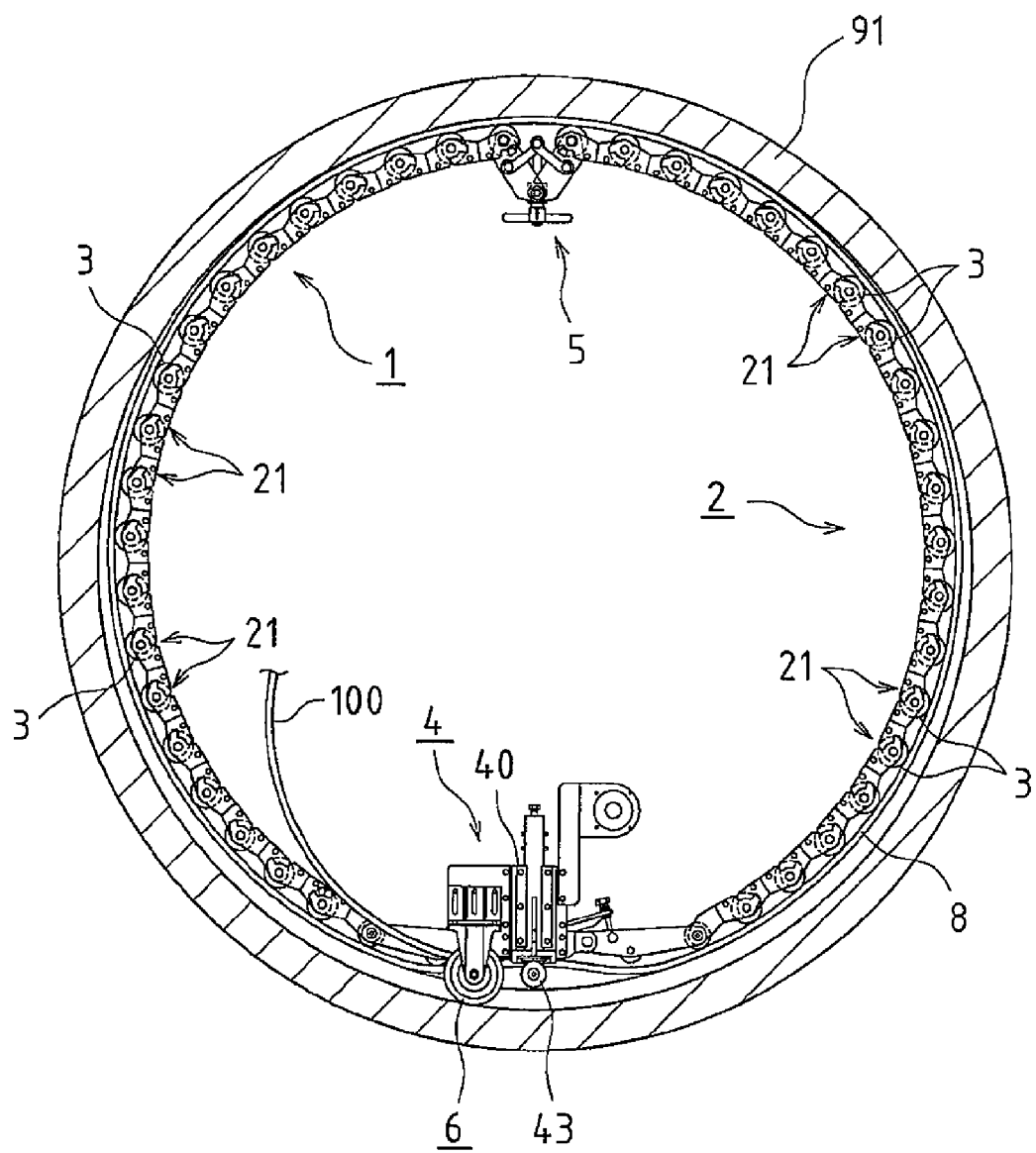
FIG. 11 is a front view illustrating one example of the pipe forming device.
Figure 12:
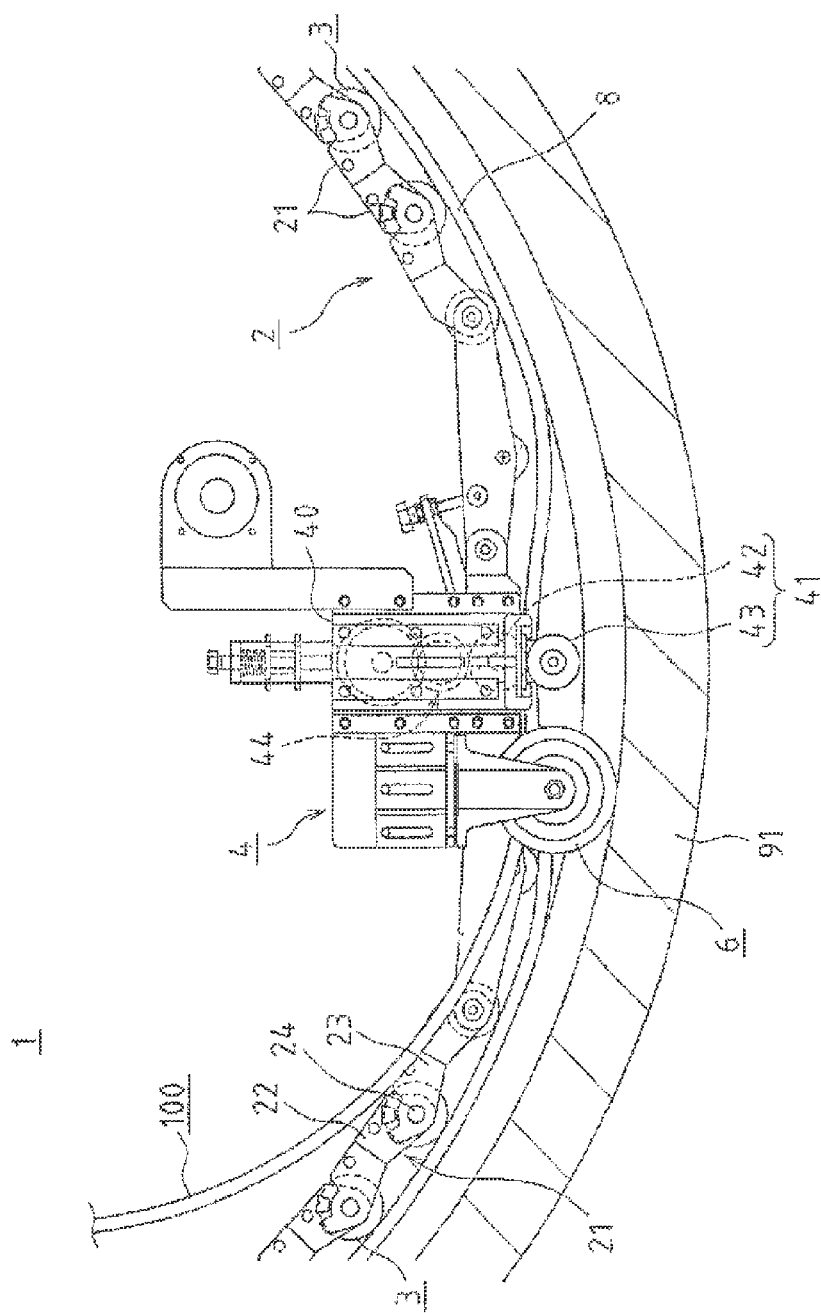
FIG. 12 is a front view enlargedly illustrating a joining mechanism of the pipe forming device.
Figure 13:
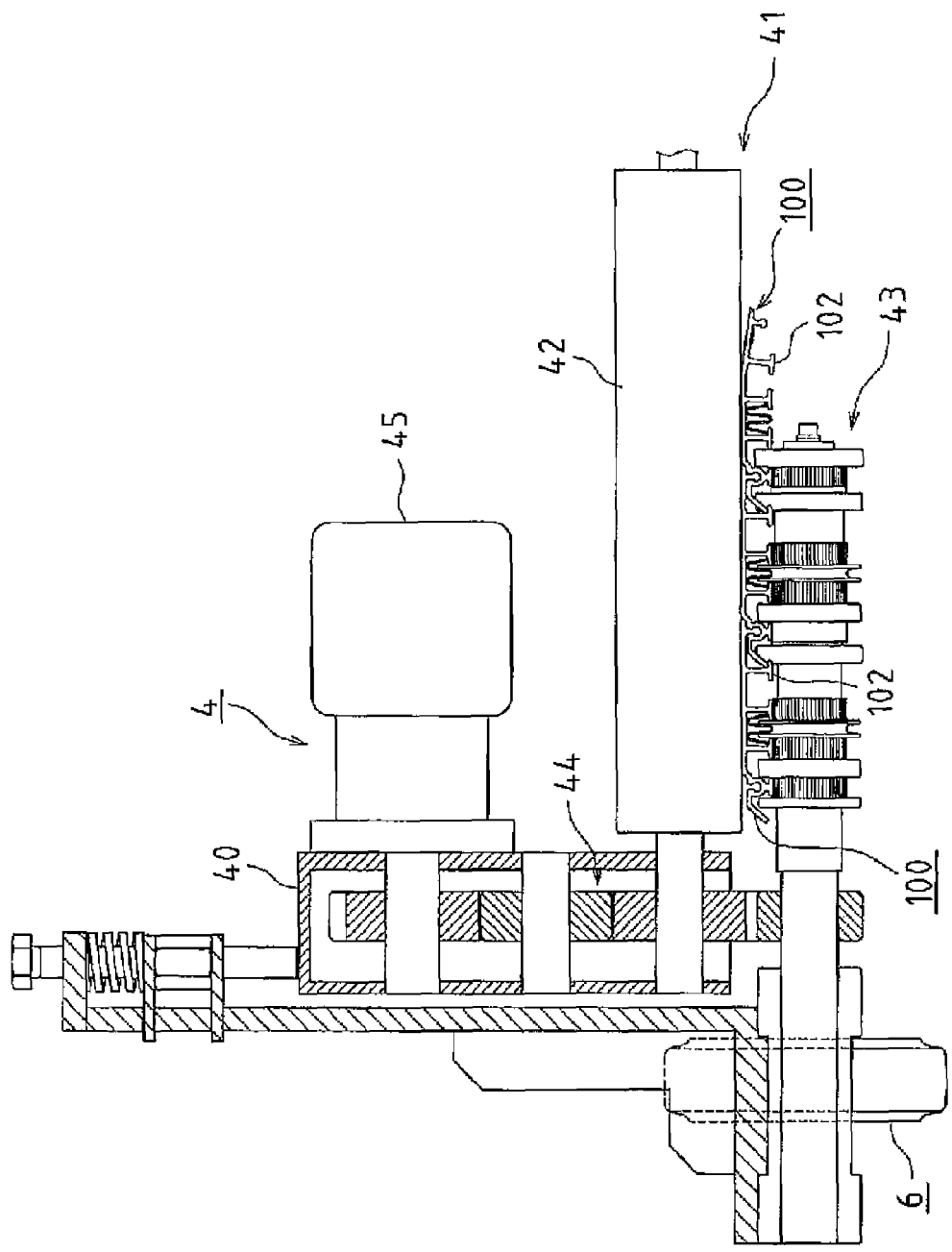
FIG. 13 is a side view of the joining mechanism.

With reference to FIGS. 11 to 13, the pipe forming device 1 will be described below. The pipe forming device 1 comprises: a shaping frame 2 for helically guiding the strip-shaped member 100; a plurality of guide rollers 3 rotatably provided in the shaping frame 2; and a joining mechanism 4 attached to the shaping frame 2 and for joining adjacent helical windings of the strip-shaped member 100.

As illustrated in FIGS. 11 and 12, the shaping frame 2 is formed in a generally circular shape by sequentially coupling a plurality of link members 21, and rotatably coupling a bendable link 5 in a bent state, to respective endmost ones of the link members 21. Each of the link members 21 is formed by rotatably coupling an inner link frame 22 and an outer link frame 23 together through a coupling shaft 24. Each of the plurality of guide rollers 3 is rotatably supported with respect to the shaping frame 2 through the coupling shaft of adjacent ones of the link members 21.

As illustrated in FIGS. 12 and 13, the joining mechanism 4 comprises: a casing 40; and a pinch roller 41 comprising a set of an inner-surface roller 42 and an outer-surface roller 43, and a gear train 44 for rotating the pinch roller 41 at a reduced speed, and a hydraulic motor 45, which are provided inside the casing 40. A support wheel 6 is provided on a lateral portion of the joining mechanism 4. When the hydraulic motor 45 is activated, the inner-surface roller 42 and the outer-surface roller 43 are rotated in respective opposite directions via gears of the gear train 44 meshed with each other while being fixed, respectively, to an output shaft of the hydraulic motor 45, a rotary shaft of the inner-surface roller 42 and a rotary shaft of the outer-surface roller 43. The rotation directions are set to allow the strip-shaped member 100 to be sent out while being nipped between the inner-surface roller 42 and the outer-surface roller 43.

(Strip-Shaped Member)

With reference to FIGS. 14(a) and 14(b), the strip-shaped member 100 will be described below. The strip-shaped member 100 is formed by subjecting a synthetic resin having bendability, such as hard vinyl chloride, polyethylene or polypropylene, to an extrusion molding process.

As illustrated in FIG. 14(a), the strip-shaped member 100 is fed to the pipe forming device 1 in such a manner that a back surface of a base plate 101, i.e., a surface on which aftermentioned ribs 102 and others are standingly provided, served as an outer peripheral surface thereof. The strip-shaped member 100 is provided with a plurality of cross-sectionally T-shaped ribs 102.

As illustrated in FIGS. 14(a) and 14(b), a joining convex portion 103 of one of adjacent windings of the strip-shaped member 100 is fitted into a joining concave portion 105 of the other winding of the strip-shaped member 100 from an inner side of the other winding (an inner peripheral surface of a leading one of adjacent windings of the strip-shaped member 100). A distal end of an inclined rib 106 is engaged with one of the ribs 102 of the one winding of the strip-shaped member 100. The adjacent windings of the strip-shaped member 100 can be joined together in this manner to form a rehabilitation pipe 8 having a predetermined pipe diameter (see FIG. 6).

(Implementation Process)

With reference to FIGS. 6 and 11 to 13, an implementation process of rehabilitating an existing pipe 91 using the pipe forming device 1, and a method of feeding the strip-shaped member 100, will be described below. Examples of the existing pipe 91 include an aging sewage pipe, water supply pipe, agricultural water pipe and gas pipe.

The existing pipe 91 is provided with a plurality of manholes 92 at intervals of a given span, so that a rehabilitation pipe 8 is formed in the existing pipe 91 by utilizing the manholes 92. For example, an upstreammost manhole and a downstreammost manhole of a target region to be rehabilitated (rehabilitation region) are used, respectively, as a start-side manhole and a goal-side manhole, the rehabilitation pipe 8 is formed in a direction from the start-side manhole to the goal-side manhole. FIG. 6 illustrates only the start-side manhole 92.

The feeding device 10 is installed in the start-side manhole 92, and the support frame 12 is swingingly moved in regard to the mount 11 around the horizontal shaft 114 to adjust an angle with respect to the support frame 12. After the adjustment of the support frame 12, a fixing bolt is screwed through the guide groove 116 of the guide plate 112 into a female screw of the support frame 12, thereby fixing the support frame 12 in an inclined state.

Subsequently, the strip-shaped member 100 is sequentially pulled out from the side of an inner periphery of the drum 93 on the ground, and led into the start-side manhole. Further, the strip-shaped member 100 is inserted between the feeding rollers 15, 161 via the guide trough 151 of the feeding device 10, and led inside the existing pipe 91. Then, the strip-shaped member 100 is inserted into the pinch roller 41 of the joining mechanism 4 of the pipe forming device 1, and sent outside the guide rollers 3 of the shaping frame 2 of the pipe forming device 1.

The pipe forming device 1 is orbitally moved about an axis of the existing pipe 91 to form a rehabilitation pipe 8. The pipe forming device 1 is displaced toward the goal-side manhole, i.e., in such a manner as to increase a distance from the feeding device 10 installed in the start-side manhole 92. For this reason, the feeding device 10 is driven in synchronization with an operation of the pipe forming device 1. Specifically, the rotating motor M1 is activated to rotate the drive roller 121, thereby rotating the rotary frame 13 with respect to the support frame 12 at a predetermined angular velocity. Concurrently, the feeding motor M2 is activated to rotate the feeding roller 15 via the driving force transmission mechanism 17 at a predetermined rotational speed, thereby feeding the strip-shaped member 100 while nipping the strip-shaped member 100 in cooperation with the feeding roller 161.

Thus, even when the pipe forming device 1 is orbitally moved about the axis of the existing pipe 91 and displaced toward the goal-side manhole in such a manner as to increase the distance from the feeding device 10, the strip-shaped member 100 is allowed to be maintained in a helical configuration having a predetermined helical diameter and helical pitch. In addition, the strip-shaped member 100 having the predetermined helical diameter and helical pitch can be fed to the pipe forming device 1 while adding the number of pitches necessary for compensating for a value corresponding to the displacement of the pipe forming device 1. Thus, it becomes possible to stably feed the strip-shaped member 100 to the pipe forming device 1 in the form of a helical configuration without occurrence of breakage or reversing in position.

In cases where an existing pipe 91 as a rehabilitation target has a relatively large length, it is preferable to additionally install the feeding device 10 with a predetermined distance on a as-needed basis, and synchronously drive the plurality of feeding devices 10.

When the feeding device 10 is additionally installed in the existing pipe 91, the added feeding device 10 is led inside the existing pipe 91 via a start-side manhole 92, and moved to a predetermined position using the wheels 118. Then, coupling member 18 is removed, and the upper half-segment 12B is separated from the lower half-segment 12A of the support frame 12. Further, the coupling piece 18 of the rotary frame 13 is removed, and the second half segment 13B is rotationally moved around the coupling shaft 130. Then, the butterfly nuts 143 are loosened, and the guide member 16 is separated from the mounting bracket 14. This makes it possible to allow the helical, strip-shaped member 100 fed from the feeding device 10 previously installed in the start-side manhole 92 to the pipe forming device 1, to be led to the guide trough 151 of the added feeding device 10, without causing breakage of the helical, strip-shaped member 100.

After completion of the process of forming the rehabilitation pipe 8 over the overall length of the target region of the existing pipe 91, a portion of the strip-shaped member 100 at an end of the rehabilitation pipe 8 is cut off. Then, the pipe forming device 1 and the feeding device 10 are disassembled, and the pipe forming device 1, the feeding device 10, a hydraulic unit and others are taken away via a manhole.

In the present invention as mentioned above, the feeding motor M2 is installed to the rotation-free support frame 12. Further, the feeding rollers 15, 161 are rotated together with the rotary frame 13 being rotated, while being rotated about respective axes thereof, so that it becomes possible to feed out the strip-shaped member 100 in the form of a helical configuration.

Thus, a power line for supplying a power to the feeding motor M2, e.g., a hydraulic pressure hose or an electricity cable can be readily connect and disconnected, so that it becomes possible to significantly facilitate such a line installation task.

It is obvious to those skilled in the art that the present invention can be implemented in various forms without departing from the spirit and scope thereof as set forth in appended claims. Therefore, the aforementioned embodiment has been shown and described, simply by way of illustration, and is not meant to be construed in a limiting sense. The scope of the invention should be determined by the appended claims and their legal equivalents, and it is not bound by the description of this specification. Furthermore, such changes and modifications falling within the appended claims and their legal equivalents should be construed as being included in the scope of the present invention.

INDUSTRIAL APPLICABILITY

The present invention is suitably usable in rehabilitation of existing pipes using a strip-shaped member, a feeding device, and a pipe forming device.

EXPLANATION OF CODES

1: pipe forming device
2: shaping frame
3: guide roller
4: joining mechanism
6: support wheel
8: rehabilitation pipe
10: feeding device
11: mount
118: wheel
12: support frame
13; rotary frame
14: mounting bracket
15: feeding roller
151: guide trough
16: guide member
161: feeding roller
162: guide roller
17: driving force transmission mechanism
100: strip-shaped member
M1: rotating motor
M2: feeding motor

What is claimed is:

1. A feeding device for feeding out a strip-shaped member in the form of a helical configuration, comprising:
   a support frame;
   an annular-shaped rotary frame located on the inside of an inner periphery of the support frame and supported in a rotatable manner;
   paired feeding rollers supported with respect to the rotary frame and configured to nip the strip-shaped member therebetween;
   a rotating motor installed to the support frame to rotate the rotary frame;
   a feeding motor installed to the support frame to rotate at least one of the feeding rollers;
   and a driving force transmission mechanism comprising an endless-shaped rotatable member wound around an outer peripheral surface of the rotary frame and relatively rotatable with respect to the rotary frame in a circumferentially-movable manner,
   wherein
   the feeding device is configured such that the rotary frame is rotated by driving of the rotating motor through a roller or a gear, and at least one of the feeding rollers is rotated by driving of the feeding motor through the driving force transmission mechanism.

2. The feeding device as defined in claim 1, wherein the rotary frame is comprised of a plurality of segments which are separably coupled together, and the at least one feeding roller is detachably coupled to the rotary frame, whereby the strip-shaped member can be set in a nipped state.

3. The feeding device as defined in claim 1, wherein the rotary frame is provided with a guide for guiding the strip-shaped member to the feeding rollers.

4. The feeding device as defined in claim 1, wherein rotation of the feeding motor is transmitted to the rotatable member through at least one selected from the group consisting of a sprocket, a gear, a roller and a belt, to cause the rotatable member to be circulatingly moved along the rotary frame.

5. The feeding device as defined in claim 1, wherein rotation of the rotatable member is transmitted to the at least one feeding roller through at least one selected from the group consisting of a sprocket, a gear, a roller and a belt, to cause the at least one feeding roller to be rotated.

6. The feeding device as defined in claim 1, wherein the rotatable member is a chain or a belt.

7. The feeding device as defined in claim 1, wherein the driving force transmission mechanism comprises: a drive sprocket configured to be rotated by the feeding motor; the rotatable member, wherein the rotatable member is configured to be circulatingly moved along the rotary frame according to rotation of the drive sprocket; a driven sprocket configured to be rotated by the rotatable member; a drive bevel gear configured to be rotated according to rotation of the driven sprocket; a driven bevel gear meshed with the drive bevel gear; and a rotary-shaft coupling configured to transmit rotation of the driven bevel gear to the at least one feeding roller.

8. The feeding device as defined in claim 1, which further comprises a mount provided below the support frame, the mount having a traveling wheel.

9. The feeding device as defined in claim 1, which further comprises a mount provided below the support frame, wherein the support frame is supported with respect to the mount in a swingable manner about a horizontal shaft.

10. The feeding device as defined in claim 1, wherein the endless-shaped rotatable member is co-centric with the rotary frame.

11. A method of feeding, to a pipe forming device, a strip-shaped member to be formed in a rehabilitation pipe, comprising the steps of:
   preparing a plurality of strip-shaped member feeding devices each comprising: a support frame; an annular-shaped rotary frame located on the side of an inner periphery of the support frame and supported in a rotatable manner; paired feeding rollers supported with respect to the rotary frame and configured to nip the strip-shaped member therebetween; a rotating motor installed to the support frame to rotate the rotary frame; a feeding motor installed to the support frame to rotate at least one of the feeding rollers; and a driving force transmission mechanism comprising an endless-shaped rotatable member wound around an outer peripheral surface of the rotary frame and relatively rotatable with respect to the rotary frame in a circumferentially-movable manner, wherein the rotary frame is comprised of a plurality of segments which are separably coupled together, and the at least one feeding roller is detachably coupled to the rotary frame, whereby the strip-shaped member can be set in a nipped state;
   installing the feeding devices in a rehabilitation pipe at a plurality of positions at intervals;
   penetratingly inserting the strip-shaped member in the rotary frame after releasing the coupling of the segments thereof;
   detaching the at least one feeding roller and nipping the strip-shaped member between the paired feeding rollers;
   attaching the feeding rollers to one of the separated segments of the rotary frame and coupling the separated segments of the rotary frame together to form an annular shape; and
   feeding out the strip-shaped member from one of the feeding devices toward a forward one of the remaining feeding devices or toward the pipe forming device, in the form of a helical configuration.

12. The method as defined in claim 11, wherein the endless-shaped rotatable member is co-centric with the rotary frame.

* * * * *